R. J. Morrison,
Harvester Cutter.
No. 13,433.
Patented Aug. 14, 1855.
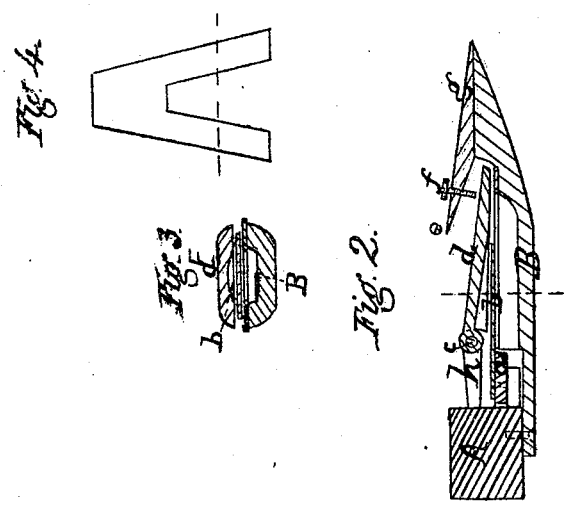
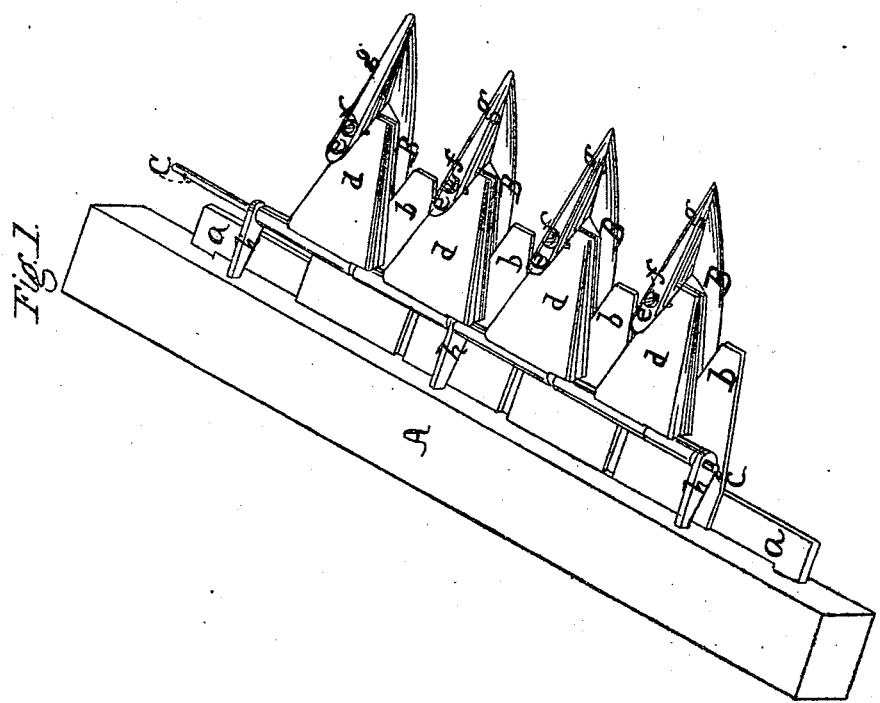

UNITED STATES PATENT OFFICE.

ROBERT J. MORRISON, OF RICHMOND, VIRGINIA.

IMPROVEMENT IN CUTTING APPARATUS FOR HARVESTERS.

Specification forming part of Letters Patent No. 13,433, dated August 14, 1855.

*To all whom it may concern:*

Be it known that I, ROBERT J. MORRISON, of Richmond, in the county of Henrico and State of Virginia, have invented certain new and useful Improvements in Harvesting-Machines; and I do hereby declare the following to be a full, clear, and exact description of the same, reference being had to the accompanying drawings, making a part thereof, in which—

Figure 1 represents in perspective a portion of the cutting apparatus of a harvesting-machine to which my invention relates. Fig. 2 represents a vertical longitudinal section through one of the fingers. Fig. 3 represents a vertical transverse section through one of the fingers; and Fig. 4 represents one of the stationary knives or cutters detached.

Similar letters, where they occur in the several drawings, denote like parts.

To enable others skilled in the art to make and use my invention, I will proceed to describe the same with reference to the drawings.

A represents the front part of the platform of any ordinary harvesting-machine, to which the fingers, guards, or guides for the cutters are usually attached.

*a* is a bar to which the cutting-blades *b* are attached, said bar, with its blades, being vibrated back and forth through the fingers by any of the contrivances well known for this purpose.

*c* is a rod or shaft hung in any suitable supports, *h*, and upon which said rod or shaft are strung, so as to freely hinge or pivot thereon, the lids or covers *d*, each one having a vertical motion independent of the others, so as to yield either up or down, as circumstances may require. The forward points of these lids are underneath the rearward-projecting points *e* of the guards or fingers *g*, and through the points *e* are passed set-screws *f*, by which the extent of the rising motion of the lids *d* may be regulated at pleasure. These lids *d* may be cast solid, so as to have within themselves the weight necessary to hold them against the top surface of the knives moving below them; or they may be hollow underneath, with their edges merely resting on the moving cutters; or they may be struck up out of sheet metal, or made of bent bars, as may be found most expedient.

B represents the fingers proper. They are secured to the bar A, and project forward to raise up, divide, and properly bring the grass or grain to the cutters, and also perform the function of guards to the cutters. The body of these fingers is cast hollow or concave, and their margin surrounded with a V-shaped blade, against which the movable blades *b* cut shear-fashion. The form of these V-shaped blades is distinctly shown in Fig. 3, and the sunken part of the finger, which they margin forms, as it were, a receptacle for the gummy matter, wire-grass, and such other material as usually chokes up or clogs cutters, to drop into, and, as the rear of said receptacles are open, may pass or be readily cleaned out.

I propose making the stationary cutters, Fig. 3, sickle-edged, the movable ones knife-edged; and instead of placing the stationary or V-shaped cutters upon the fingers underneath the vibrating cutters, I claim the right of placing them, if I so elect, upon the lids *d* and over or above the movable cutters. In this latter case they could not strictly be called stationary knives or blades, as they would rise and fall with the lids vertically, but would not reciprocate horizontally. The purpose of this arrangement is for cleaning the movable cutter of all clogging matter, the lids, whether the blades be attached to them or not, resting upon the moving cutter-blades, and each one scraping or removing all accumulations thereon, or rising and falling independent of each other, though they may be hung in pairs or sets, but are better hung singly.

Having thus fully described the nature of my invention, what I claim therein as new, and desire to secure by Letters Patent, is—

The hinging of the lids and allowing them to rest severally and independently upon the moving cutters, in the manner and for the purpose substantially as herein set forth.

ROBT. J. MORRISON.

Witnesses:
J. W. PEGRAM,
WALTER NEALE.